McGowan & Hall,
Fly Net,
No. 81,099.      Patented Aug. 18, 1868.
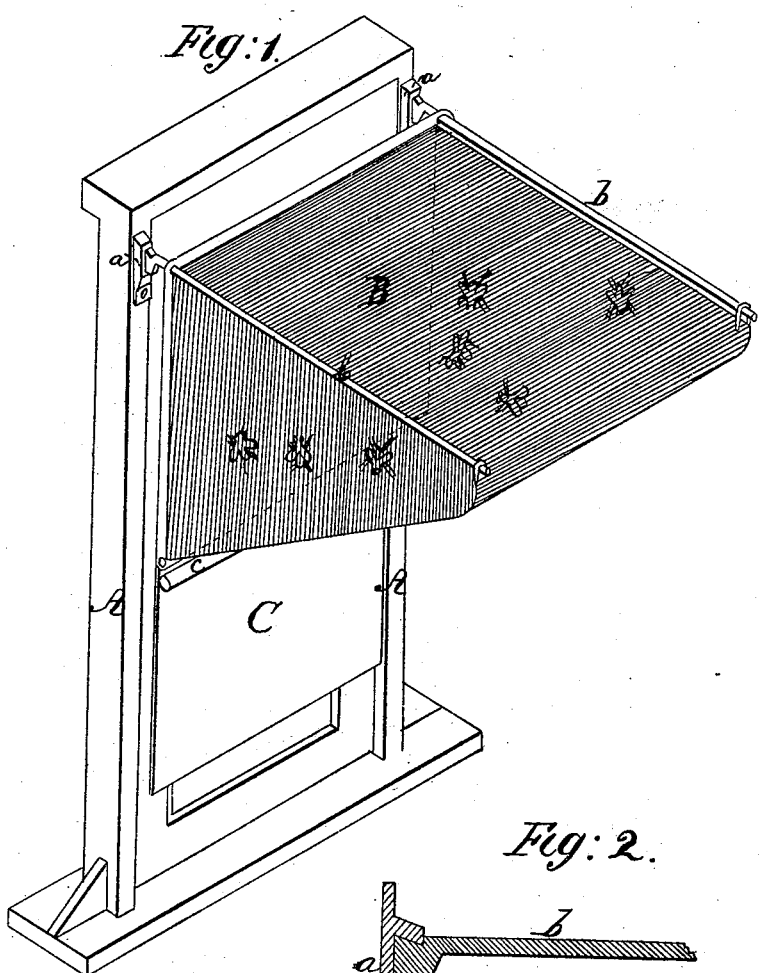
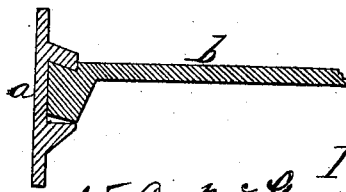
Witnesses:
Leopold Koch
A. N. Marr
Inventor;
W. C. McGowan
2 M Hall
per Abander & Mason
Attys.

United States Patent Office.

WILLIAM C. McGOWAN AND J. MADISON HALE, OF GEORGIA PLAINS, VERMONT.

Letters Patent No. 81,099, dated August 18, 1868.

IMPROVED FLY-NET FOR WINDOWS.

*The Schedule referred to in these Letters Patent and making part of the same.*

TO ALL WHOM IT MAY CONCERN:

Be it known that we, WILLIAM C. McGOWAN and J. MADISON HALE, of Georgia Plains, in the county of Franklin, and in the State of Vermont, have invented certain new and useful Improvements in Fly-Nets and Traps; and do hereby declare that the following is a full, clear, and exact description thereof, reference being had to the accompanying drawings, and to the letters of reference marked thereon.

The nature of our invention consists in the construction of a net or trap, to be applied to the outside of a door or window, for the purpose of catching flies.

In order to enable others skilled in the art to make and use our invention, we will now proceed to describe its construction and operation, referring to the annexed drawings, which form a part of this specification, and in which—

Figure 1 is a perspective view, and

Figure 2 a side section of the net-fastening.

A represents a window-frame, on the outside of which, in the upper corners, are two small brackets, $a\ a$. In these brackets the rods $b\ b$ are placed, in such manner that they can easily be removed therefrom.

On these rods $b\ b$ a net or bag, B, is suspended, said bag being made of any suitable material, and its mouth extending across the whole width of the window, and about two-thirds of the way down. It then gradually tapers off to a point at the ends of the rods $b\ b$.

The lower side of the mouth of said bag is attached to a rod, $c$, extending across the window, so that the bag may remain open, and cover nicely the opening; and below the bag is a piece of cloth or other suitable material, C, also attached to the rod $c$, so as to cover that part of the window which is not covered by the bag or net B.

It is well known that flies can easily be driven from one room to another, or out through the window, and by the application of such a device as above described, they can easily be driven into it and be caught.

After they have been driven into this bag, the operator gathers the mouth thereof in his hand, and unhooks it from the rods, and then the bag is put into hot water or soap-suds until the flies are killed.

The flap C may also be used to close the mouth of the bag B, after the flies have been driven into the same, so that it will be easier to destroy them without any danger of allowing them to escape.

We do not confine ourselves to the particular shape of the bag or net herein described, nor to the particular mode of suspending the same, as that may be varied to suit everybody.

Having thus fully described our invention, what we claim as new, and desire to secure by Letters Patent, is—

A bag of netting, B, extended over the frame $b\ b$, &c., over the upper portion of a window, and provided with the flap C, for closing the mouth, as and for the purposes described.

In testimony that we claim the foregoing, we have hereunto set our hands and seals, this 25th day of May, 1868.

WM. C. McGOWAN. [L. S.]
J. M. HALE. [L. S.]

Witnesses:
A. N. MARR,
H. H. HALE.